(12) United States Patent
Pollmann et al.

(10) Patent No.: US 9,467,222 B1
(45) Date of Patent: Oct. 11, 2016

(54) SYSTEMS AND METHODS FOR PARALLEL COMMUNICATION WITH MULTIPLE BLUETOOTH DEVICES

(71) Applicant: Fortify Technologies, LLC, Minneapolis, MN (US)

(72) Inventors: Mark R. Pollmann, Brooklyn Park, MN (US); Andrew Chan Ledesma, Thomaston, CT (US); Dario Aberion Rondrique, Lilo-an (PH); Regulus Baguio Berdin, Lapu-lapu (PH)

(73) Assignee: Fortify Technologies, LLC, Minneapolis, MN (US)

( * ) Notice: Subject to any disclaimer, the term of this patent is extended or adjusted under 35 U.S.C. 154(b) by 0 days.

(21) Appl. No.: 14/695,012

(22) Filed: Apr. 23, 2015

Related U.S. Application Data

(60) Provisional application No. 61/982,945, filed on Apr. 23, 2014.

(51) Int. Cl.
| | |
|---|---|
| *H04B 7/00* | (2006.01) |
| *H04M 1/00* | (2006.01) |
| *H04B 7/24* | (2006.01) |
| *H04W 4/00* | (2009.01) |
| *H04L 29/08* | (2006.01) |
| *H04B 1/713* | (2011.01) |

(52) U.S. Cl.
CPC ............ *H04B 7/24* (2013.01); *H04B 1/713* (2013.01); *H04L 67/06* (2013.01); *H04W 4/008* (2013.01)

(58) Field of Classification Search
CPC ... H04B 1/3818; H04B 5/003; H04W 48/16; H04W 76/025; H04W 84/18
USPC ........ 455/41.1–41.3, 557–558, 507, 517, 514
See application file for complete search history.

(56) References Cited

U.S. PATENT DOCUMENTS

| | | | |
|---|---|---|---|
| 6,842,460 B1 * | 1/2005 | Olkkonen | H04W 48/16 370/328 |
| 6,850,512 B1 * | 2/2005 | Bishop | H04W 28/18 370/235 |
| 7,031,945 B1 * | 4/2006 | Donner | G06Q 10/02 235/382 |
| 7,218,644 B1 * | 5/2007 | Heinonen | H04B 1/7143 370/468 |
| 8,145,264 B1 | 3/2012 | Hirsch et al. | |
| 8,738,925 B1 | 5/2014 | Park et al. | |
| 8,745,247 B1 | 6/2014 | Park et al. | |
| 2003/0134596 A1 * | 7/2003 | Zhu | H04W 88/08 455/41.1 |

(Continued)

FOREIGN PATENT DOCUMENTS

CN          201114025 Y     9/2008

OTHER PUBLICATIONS

Prabhu C.S.R. and Prathap A. Reddi, "*1.5 Serial and Parallel Communicaton*" in "*Bluetooth Technology and its applications with Java and J2ME,*" 2004, pp. 8-9. prentice Hall of India Private Limited, New Delhi.

(Continued)

*Primary Examiner* — Simon Nguyen
(74) *Attorney, Agent, or Firm* — Jon Ben Griffith

(57) ABSTRACT

A system and method for gathering data from Bluetooth devices. The system connects to two or more Bluetooth client devices and assigns the Bluetooth client devices to different Bluetooth channels. Information is then downloaded from the connected Bluetooth client devices that meet a first set of one or more criteria.

26 Claims, 10 Drawing Sheets

(56) References Cited

U.S. PATENT DOCUMENTS

| | | | | |
|---|---|---|---|---|
| 2004/0081110 A1* | 4/2004 | Koskimies | ............... | H04L 63/10 370/315 |
| 2005/0210101 A1* | 9/2005 | Janik | ................ | G06F 17/30044 709/203 |
| 2005/0233728 A1* | 10/2005 | Karaoguz | ........... | H04L 12/5695 455/406 |
| 2006/0025075 A1* | 2/2006 | Chung | ................. | H04W 84/18 455/41.2 |
| 2006/0034231 A1* | 2/2006 | Tailor | .................... | H04W 88/02 370/338 |
| 2009/0006677 A1* | 1/2009 | Rofougaran | ......... | H01Q 1/2275 710/63 |
| 2009/0305634 A1* | 12/2009 | Nguyen | ............... | H04W 72/12 455/41.2 |
| 2012/0137346 A1* | 5/2012 | Lee | ....................... | G06F 21/606 726/4 |
| 2014/0150037 A1* | 5/2014 | Cavgalar | .......... | H04N 21/43635 725/80 |
| 2015/0133049 A1* | 5/2015 | Lee | ....................... | H04W 4/003 455/41.1 |
| 2015/0234636 A1* | 8/2015 | Barnes, Jr. | .............. | G06F 3/167 715/728 |

OTHER PUBLICATIONS

Wikipedia, "Bluetooth," Wikipedia, Retrieved from <https://en.wikipedia.org/wiki/Bluetooth#Communication_and_connection> Jul. 28, 2015, 24 pp.

* cited by examiner

US 9,467,222 B1

SYSTEMS AND METHODS FOR PARALLEL COMMUNICATION WITH MULTIPLE BLUETOOTH DEVICES

This application claims the benefit of U.S. Provisional Application No. 61/982,945 filed Apr. 23, 2014, the entire content of which is hereby incorporated by reference

FIELD OF THE INVENTION

The present invention relates to methods, systems, and software for communicating with devices using the Bluetooth wireless protocol.

BACKGROUND OF THE INVENTION

Bluetooth is a wireless communication protocol for exchanging data between devices. A variety of devices communicate using the Bluetooth protocol including mobile phones, headsets, tablets, computer mice, keyboards, printers, PC networks, media players, video game consoles, GPS receivers, and physical activity trackers.

Bluetooth is a packet-based protocol. For each pair of communicating devices, one device acts as a master and the other device acts as a slave. Packet exchange is timed according to the master's clock which marks 625 µs time slots. Data packets may be one, three, or five slots long. For single-slot packets, the master transmits in even slots and receives in odd slots; the slave, conversely, receives in even slots and transmits in odd slots. Irrespective of packet length, the master begins transmitting in even slots and the slave begins transmitting in odd slots.

Bluetooth devices operate on 40 separate channels in the radio frequency range of 2400-2480 MHz. Each channel has a bandwidth of 1 MHz with 2 MHz between adjacent channels. A pair of connected devices changes channels every 625 µs (called "frequency hopping"). When two pairs of devices happen to select the same channel at the same time, their signals interfere and corrupt each other. When two transmissions interfere, the connected devices may initiate an error correction or retransmit the corrupted portion of data.

The background of the invention is neither exclusive nor exhaustive and is intended neither to describe all uses of the invention nor to limit the scope of the invention.

SUMMARY OF THE INVENTION

The current disclosure relates to systems, methods, and/or software for communicating with multiple devices in parallel using a wireless communication protocol, such as the Bluetooth protocol.

In one example, a method comprises detecting two or more Bluetooth client devices, connecting to the two or more detected Bluetooth client devices, wherein connecting includes assigning the Bluetooth client devices to different Bluetooth channels, and downloading information from the connected Bluetooth client devices that meet a first set of one or more criteria.

In another example, a computer-readable medium having data stored therein representing software executable by a system, the software including instructions for the system to detect two or more Bluetooth client devices, connect to the two or more detected Bluetooth client devices, wherein connecting includes assigning the Bluetooth client devices to different Bluetooth channels, and download information from the connected Bluetooth client devices that meet a first set of one or more criteria.

In another example, a system includes a memory, a processor connected to the memory, and two or more dongles connected to the processor, wherein each dongle operates under processor control to detect two or more Bluetooth client devices, to connect to the two or more detected Bluetooth client devices, wherein connecting includes assigning the Bluetooth client devices to different Bluetooth channels, and to download information from the connected Bluetooth client devices that meet a first set of one or more criteria.

In another example, a Bluetooth dongle comprises a housing, a computer interface, means for detecting two or more Bluetooth client devices, means for connecting to the two or more detected Bluetooth client devices, and means for downloading information from the connected Bluetooth client devices. The means for connecting includes means for assigning the Bluetooth client devices to different Bluetooth channels.

In yet another example, a system including a computer detects one or more dongles connected to the computer. If the system detects only one dongle, the system enters a single dongle state, wherein the single dongle detects two or more Bluetooth client devices, connects to the two or more detected Bluetooth client devices, wherein connecting includes assigning the Bluetooth client devices to different Bluetooth channels within the single dongle, and downloads information from the connected Bluetooth client devices that meet a first set of one or more criteria. If the system detects two or more dongles, the system enters a multiple dongle state, wherein the system detects two or more Bluetooth client devices, connects each detected Bluetooth client devices to at least one of the two or more dongles, and downloads information from the connected Bluetooth client devices that meet a first set of one or more criteria.

This summary of the invention is neither exclusive nor exhaustive and is intended neither to describe all possible embodiments of the invention nor to limit the scope of the invention.

DETAILED DESCRIPTION OF THE INVENTION

Figure 1:
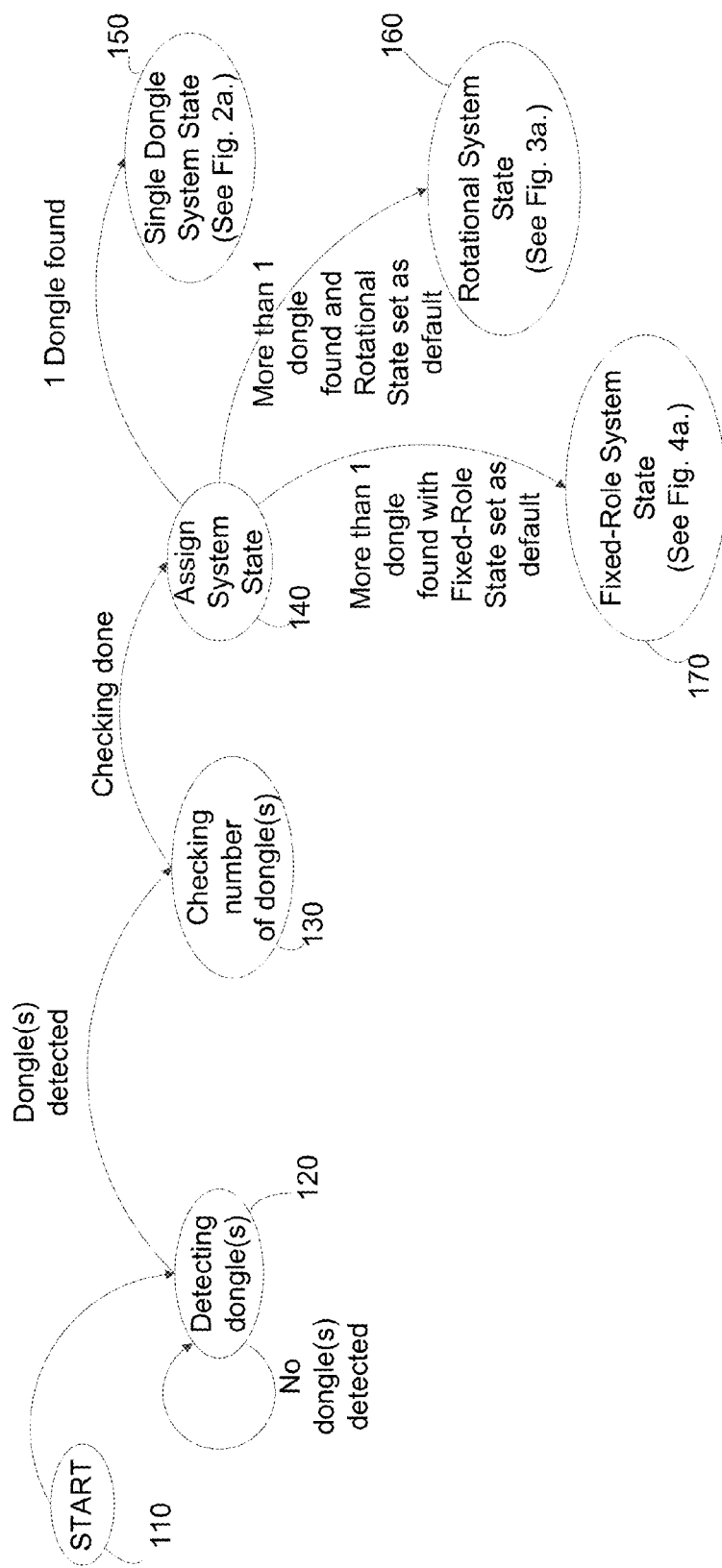
FIG. 1 is a diagram illustrating an example determination of a system state, in accordance with one or more techniques of this disclosure.

Information from the Summary of Invention section is incorporated in this Detailed Description by reference.

DEFINITIONS

For purposes of one or more of the examples described in the present disclosure, Bluetooth is a wireless communication protocol for electronic devices. As it relates to this disclosure, Bluetooth includes all versions of the protocol.

A computer includes a processor and at least one computer-readable medium. Data storage may be internal or external to the computer.

Client or User—the person using a client device. "Client" and "user" may be used interchangeably.

Scanning—the process by which a dongle listens for signals from broadcasting client devices. Scanning allows the computer to detect available client devices.

Scan—to listen for signals from broadcasting client devices.

Dongle—a device including an antenna for transmitting and receiving information via radio waves. Dongles may also include hardware support for the antenna to function. Dongles can be connected to a computer through Universal Serial Bus (USB) ports, card slots, or any other means.

Communicate—to send information that is meaningfully received by a target or to meaningfully receive information that has been sent by a target.

Connect—to establish a communication pathway that is not shared with any other computer or client device. The pathway may or may not use wires. For wireless connections, one pathway can be distinguished from another by a combination of radio frequency and time division multiplexing. Such a pathway is called a "connection."

System (as it relates to system states)—a set of hardware including a computer and at least one dongle.

System State—the way in which a computer uses one or more dongles to communicate with client devices. A "state" refers to a system state unless otherwise specified.

Single Dongle State (or simply "Single State")—a system state in which the computer is connected to only one dongle.

Rotational State—a system state in which multiple dongles take turns scanning and each dongle may perform tasks to download data from a client device.

Fixed-Role State—a system state with multiple dongles in which each dongle performs only a subset of the tasks for the system to download data from a client device.

Role—a specific set of tasks for Bluetooth communication assigned to a dongle. A role is typically a subset of all the tasks for Bluetooth communication.

Scanner Role—a role in which a dongle listens for available devices but does not download data. A dongle assigned the Scanner Role (a Scanner) may transfer the contact information of a client device it detects to a dongle assigned to the Download Role.

Download Role—a role in which a dongle may download data from a device but does not scan for available devices.

A dongle in Download Role (a Downloader) receives contact information from a Scanner dongle to connect with a detected device.

Contact Information—information sufficient for a dongle to connect to the particular device with which the contact information is associated.

Unique Identifier—any piece of information by which an individual device may be distinguished from all others. Unique identifiers include a device's address and serial number. Unique identifiers are distinguished from Universally Unique Identifiers (UUID) which identify a type of service but not an individual device.

Queue—A set in which the first member to have entered the set is the first member to exit the set.

Time Division Multiplexing (TDM)—a technique for communicating with multiple devices or applications over the same wire, radio frequency, or other medium by which communications with one device or application alternate with those of another.

Frequency-Hopping—the process of two connected devices changing the channel or radio frequency on which they communicate.

Synchronized Frequency-Hopping—the process by which multiple connections change channels in a predetermined order so that no two connections use the same channel at any one time.

Advertised Name—Information a device broadcasts regarding what type of device it is. Type may indicate function, such as activity tracker, or it may indicate a particular make or model.

Task—one step to download data from a client device. Some tasks, such as scanning, connecting, and downloading are essential. Other tasks may be added as prerequisites for downloading.

Embodiments and Figures

Current Bluetooth technology does not provide an efficient way for a computer to receive data from many devices at the same time. Because master devices have a lighter computing burden than slaves, many portable Bluetooth devices function only as masters. As a result, computers are forced to take the slave role and can only gather data from one device at a time. Even if portable Bluetooth devices acted as slaves and the computer used multi-connection dongles, the computer would be limited to seven serial connections. Serial communication limits the rate at which data can be downloaded.

People often need to collect data from many portable devices to store on a database. If the computer that contains the database is not networked to any other computer, it must be connected to at least one dongle and will be the only location at which data may be received from portable devices. If the devices are geographically dispersed, it is advantageous to have the database stored on a central server that is connected to multiple central stations. A central station is a computer that is peripheral to the server. However, central stations are central in that each is a point at which many users go to upload data from their Bluetooth devices. Because there may be many users who try to transfer their data to one central station at the same time, it is desirable for each central station to be able to receive data from multiple portable devices simultaneously and in parallel.

Databases are often divided into separate user accounts. In addition to user data, the database may also store a list of associations between particular devices and particular user accounts. New data from a particular device can be stored with previously collected data in the associated user account.

In addition to parallel communication, there are other challenges that a multi-connection Bluetooth system should address in order to operate efficiently. When there are many available devices in range, computers may need to determine from which devices they will download data. In many cases, only data associated with recognized devices should be downloaded. Recognized devices may simply be those of a particular type or they may be particular devices that have been previously registered. Ideally, such a system would automatically detect available devices and efficiently handle situations in which there were more available devices than communication capacity to handle them. If a computer has access to one or more dongles, it first determines the system state, which dictates how it will use those dongles.

Figure 5:
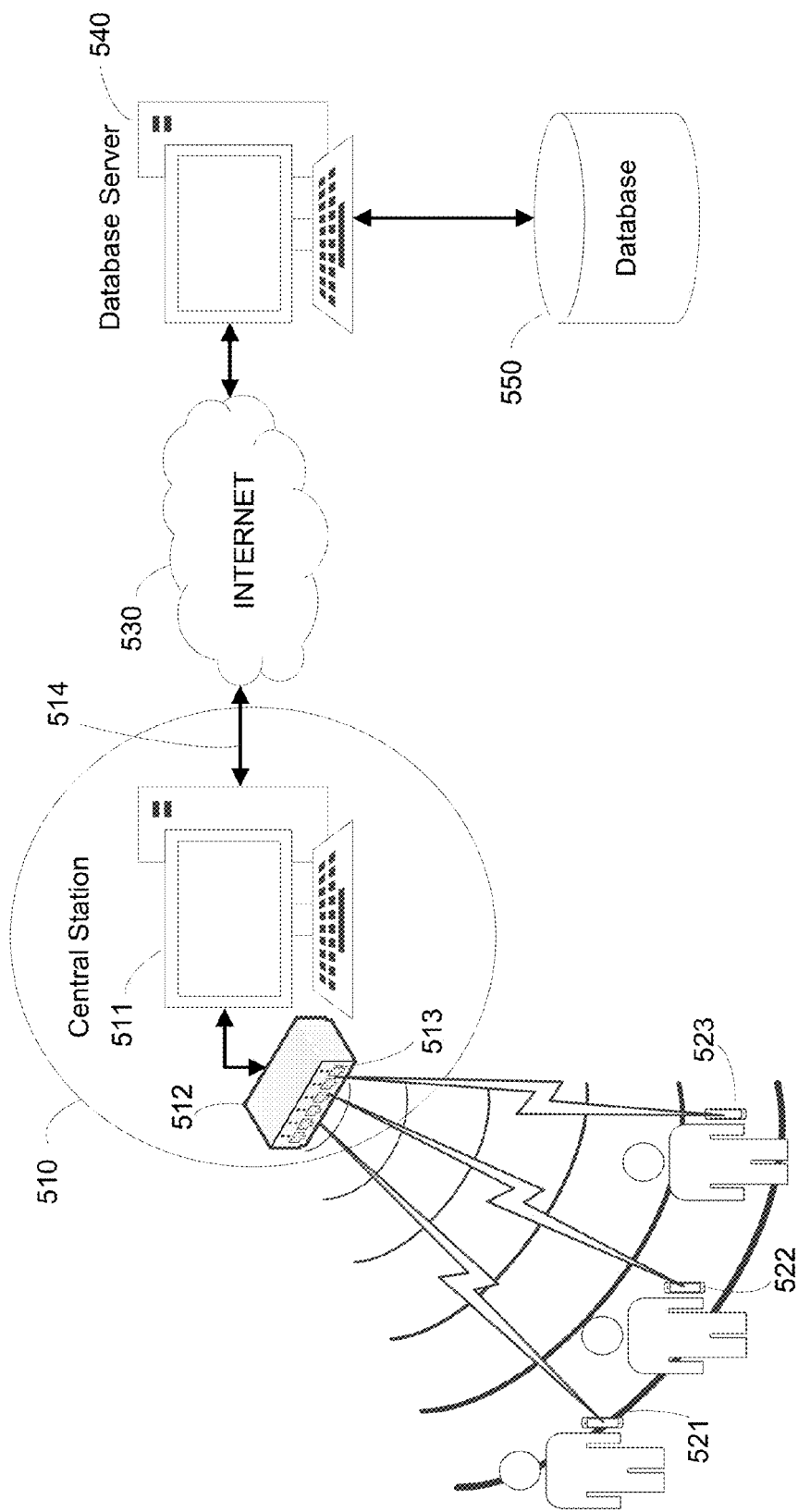
FIG. 5 is a diagram illustrating an example system for downloading data from Bluetooth devices, in accordance with one or more techniques of this disclosure.

FIG. 5 illustrates a system for gathering data from Bluetooth devices. In the example approach shown in FIG. 5, a central station 510 includes a computer 511 connected through a hub 512 to one or more Bluetooth dongles 513. The one or more Bluetooth dongles are connected in turn to client devices 521, 522 and 523 and operate to download data from client devices 521, 522 and 523. Computer 511 is also connected through a link 514 to a wide area network 530 such as the Internet, and through wide area network 530 to a database server 540. In one such example approach, the data downloaded from each of the client devices to computer 511 is transferred for permanent storage through database server 540 to database storage 550.

As shown in FIG. 5, in some example approaches, database 550 may be located remotely from the central station 510 and may receive data from central station 510. Also as shown in FIG. 5, in some example approaches, computer 511 may be connected to one or more dongles via an external USB hub 512. The lightning symbols represent the central station downloading data from three client devices 521, 522, and 523 in parallel. In the example shown, hub 512 is an external USB hub capable of housing six Bluetooth dongles 513. In some examples, Bluetooth dongles 513 (hereafter simply "dongles 513") fit into recessed slots in hub 512. In other examples, hub 512 is a USB hub connected via USB to computer 511. In some such examples, dongles 513 include a male USB connector that fits into a corresponding female connector on USB hub 513. Other communication mechanisms can be used for communication between computer 511 and hub 512 and between hub 512 and dongles 513.

In one example approach, dongle 513 includes an antenna and supporting hardware that allow computer 511 to communicate with other devices through radio waves. Single-connection dongles may only connect to devices that run on the Bluetooth Low Energy (BLE) protocol and may only communicate with one device at a time. A multi-connection dongle may communicate using other Bluetooth protocols in addition to BLE. A master device using a multi-connection dongle may connect with up to seven slave devices. However, in some such approaches, communication with the slave devices takes place serially, meaning that the master can only communicate with one slave device at a time. Slave devices can only connect to one master at a time.

In the example shown in FIG. 5, central station 510 receives the data via dongles 513 and transmits the client data over the internet 530 to a database server 540 which, in turn, stores the client data on the database 550. While the information exchange between the computers and client devices is bidirectional, the computer may have access to more data storage capacity than the client device and can be used to acquire data that has been collected by the client devices.

In one example approach, computer 511 includes software and hardware for determining the number of dongles 513 available to computer 511, and for communicating with dongles 513. One example approach is shown in FIG. 1, which shows one example of how system state can be determined. In the example shown in FIG. 1, computer 511 first detects whether or not it has any dongles (120). If it is connected to one or more dongles 513, computer 511 then determines the number of dongles 513 to which it is connected (130) and assigns a system state (140). If it detects only one dongle, the computer may select Single State (150). If the computer is connected to more than one dongle, the computer may select a Rotational State (160) or a Fixed-Role State (170).

Figure 2A:
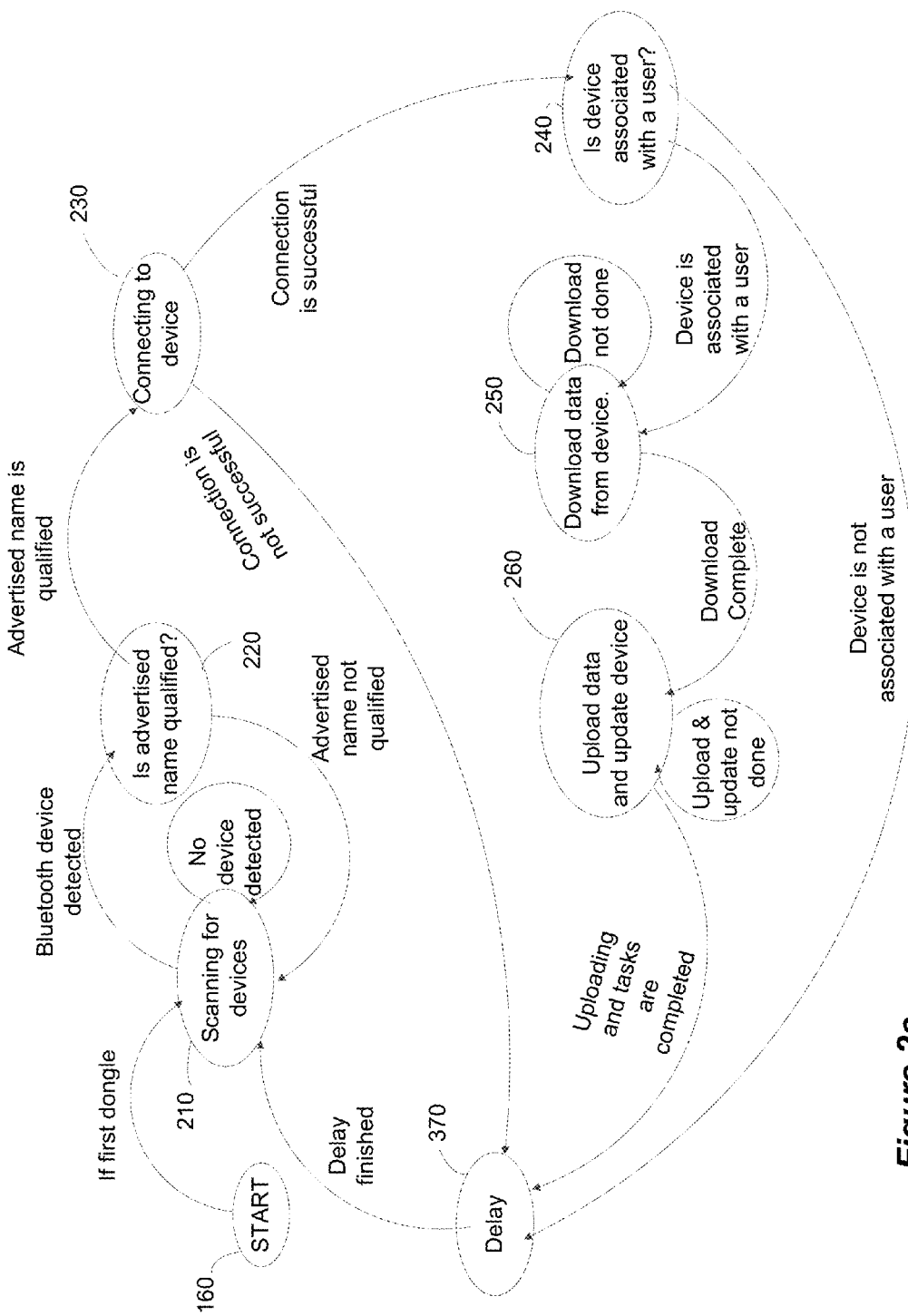
FIG. 2a is a diagram illustrating data downloading with a single dongle, in accordance with one or more techniques of this disclosure.

FIG. 2a shows one example approach to handling a single dongle 513, termed the Single State. In a Single State, the single dongle 513 is able to perform all tasks necessary to download data from a client device. After being assigned the Single State (150) as shown in FIG. 1, the dongle scans for available devices and continues scanning as long as it does not detect any devices (210). In one example approach, when the dongle detects an available device, it determines whether the advertised name is qualified—that is, whether the advertised name is on a list of those with which it may connect (220). If the advertised name is qualified, the dongle may attempt to connect to the device (230). If connection is not successful, the dongle may pause (270) before returning to scanning for available devices (210).

If connection is successful, the computer may then check whether the device is associated with a registered user (240). More specifically, in some approaches, the computer checks to see whether the device's unique identifier is on a list of registered devices. If it is, that unique identifier will be associated with a particular user account. If the device is not associated with a registered user, the dongle may pause (270) before returning to scanning (210). If the device is associated with a registered user, the dongle downloads data from the device (250), transfers the data to the user's account on database 550, and makes any necessary adjustments to the client device (260). Once complete, dongle 513 may pause before returning to scanning.

Figure 2B:
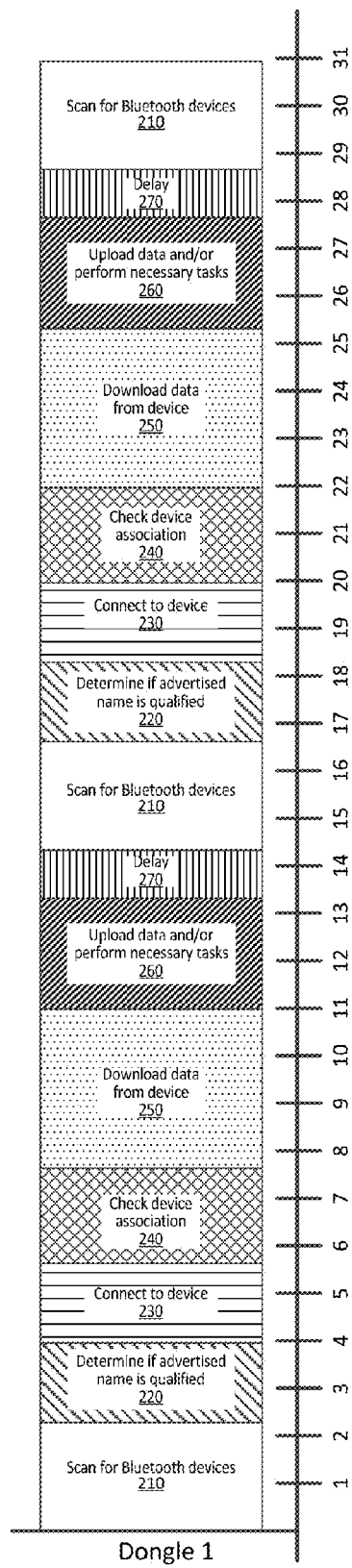
FIG. 2b is a diagram illustrating an example data download system timeline.

FIG. 2b shows an example of a sequence of tasks performed in the Single State described in FIG. 2a. In this particular example, the system downloaded data from two devices. In each case, the device's advertised name was found to be qualified and the particular device was associated with a registered user. The time scale is arbitrary.

Figure 3A:
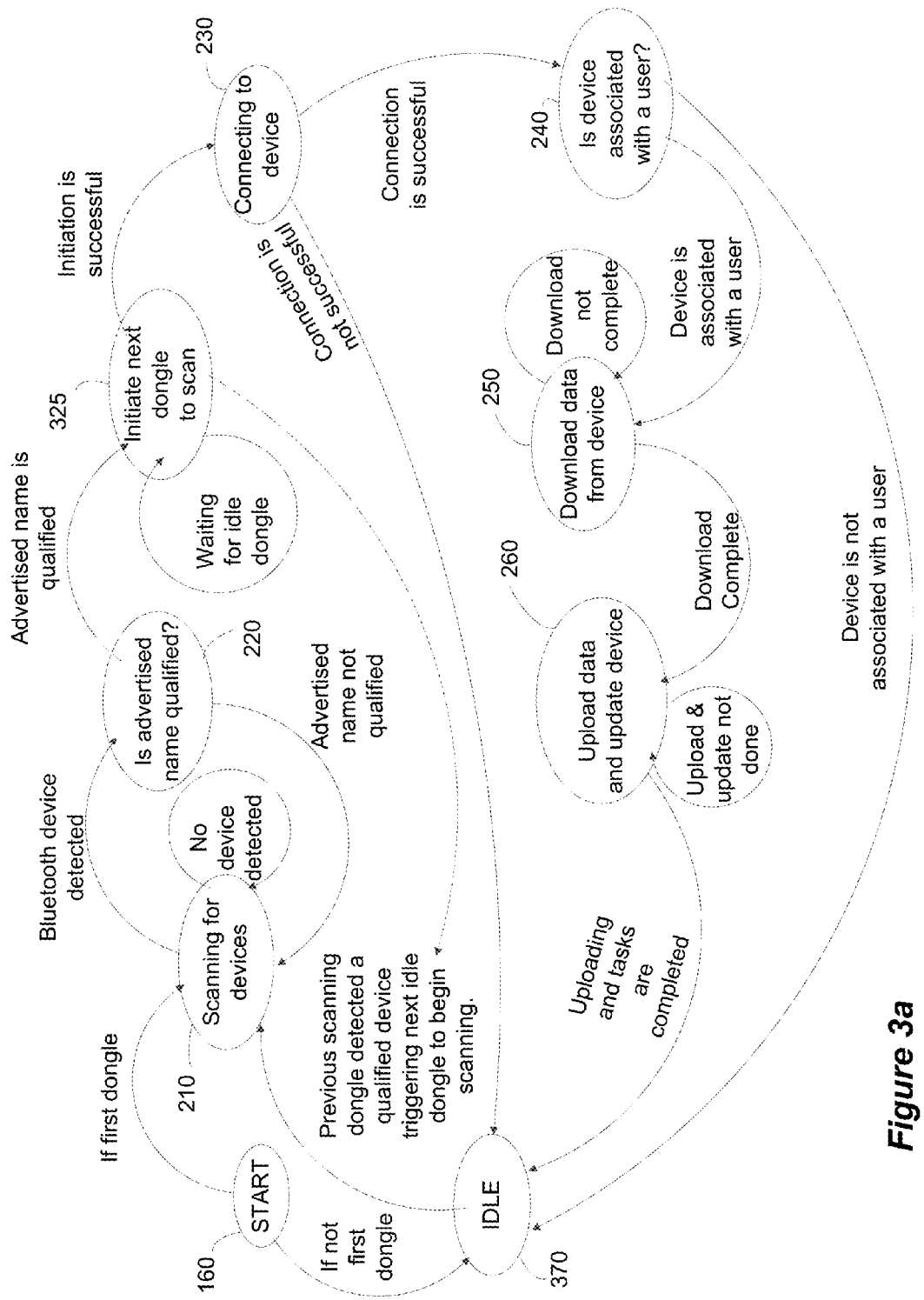
FIG. 3a is a diagram illustrating data downloading with two or more dongles, in accordance with one or more techniques of this disclosure.

FIG. 3a shows one example approach to handling multiple dongles 513 within central station 510, termed the Rotational State. In some example approaches, computer 511 may adopt a Rotational State if it has more than one dongle. In the Rotational State approach, each dongle 513 may perform all of the tasks necessary to download data from a client device. The method starts with the system being assigned to the Rotational State (160). In the first cycle, a first dongle scans for available devices (210). If it detects an available device, it determines whether the device's advertised name is qualified. That is, whether the advertised name is on a list of those with which it will connect (220). (A different embodiment may not screen devices based on advertised name.) If the advertised name is qualified, the first dongle stops scanning and the system then triggers the next idle dongle to start scanning for available devices (325). This may create the impression that the scanning task is being transferred from one dongle to another. Ultimately, the system does not start an idle dongle scanning until the previous dongle has completed scanning Once a second dongle has started scanning, the first dongle may attempt to connect to the device it discovered (230). If the dongle successfully connects to the device, it then determines whether the device is associated with a user in the database (240). (A different embodiment might use a different criterion.) If so, the system downloads the information from the device (250). When all the data is downloaded, the system transfers the data to a database and makes any necessary adjustments to the device (such as updating device software) (260). Once complete, the dongle returns to an idle state until another dongle triggers it to start scanning for devices (370).

Figure 3B:
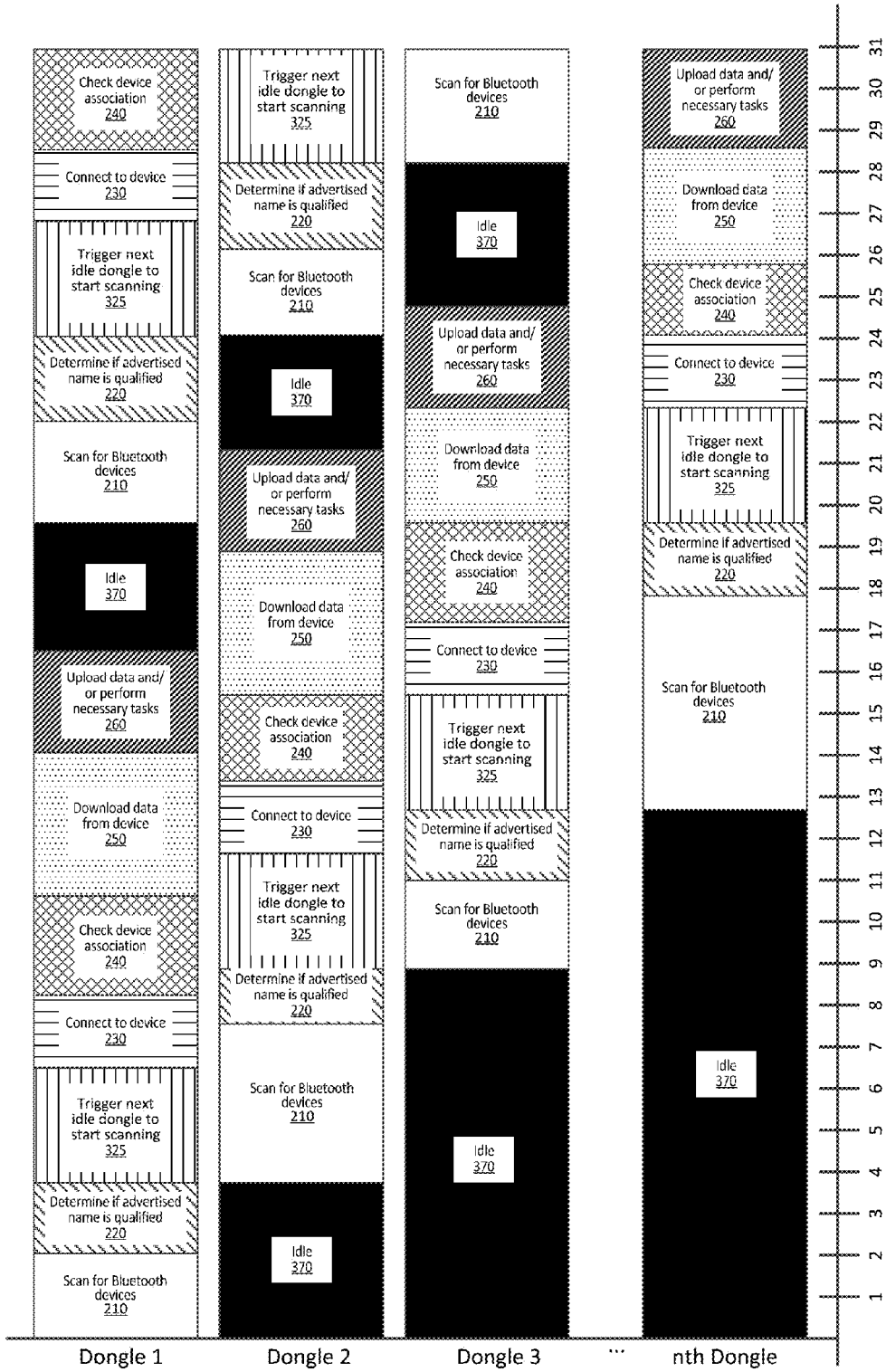
FIG. 3b is a diagram illustrating another example data download system timeline.

FIG. 3b shows an example of a sequence of tasks performed by each of four dongles 513 in the Rotational State described in FIG. 3a. The time scale is the same for all four but otherwise arbitrary. Note that, except for Dongle 1 on the first cycle, none of the dongles begins to scan until the dongle before it has triggered it to start scanning. In this way, only one dongle is scanning at a time. In each case that a dongle scanned, it found a device, the device's advertised name was found to be qualified, and the particular device was associated with a registered user. A different example might find devices that were not qualified or were not associated with a user.

Figure 4A:
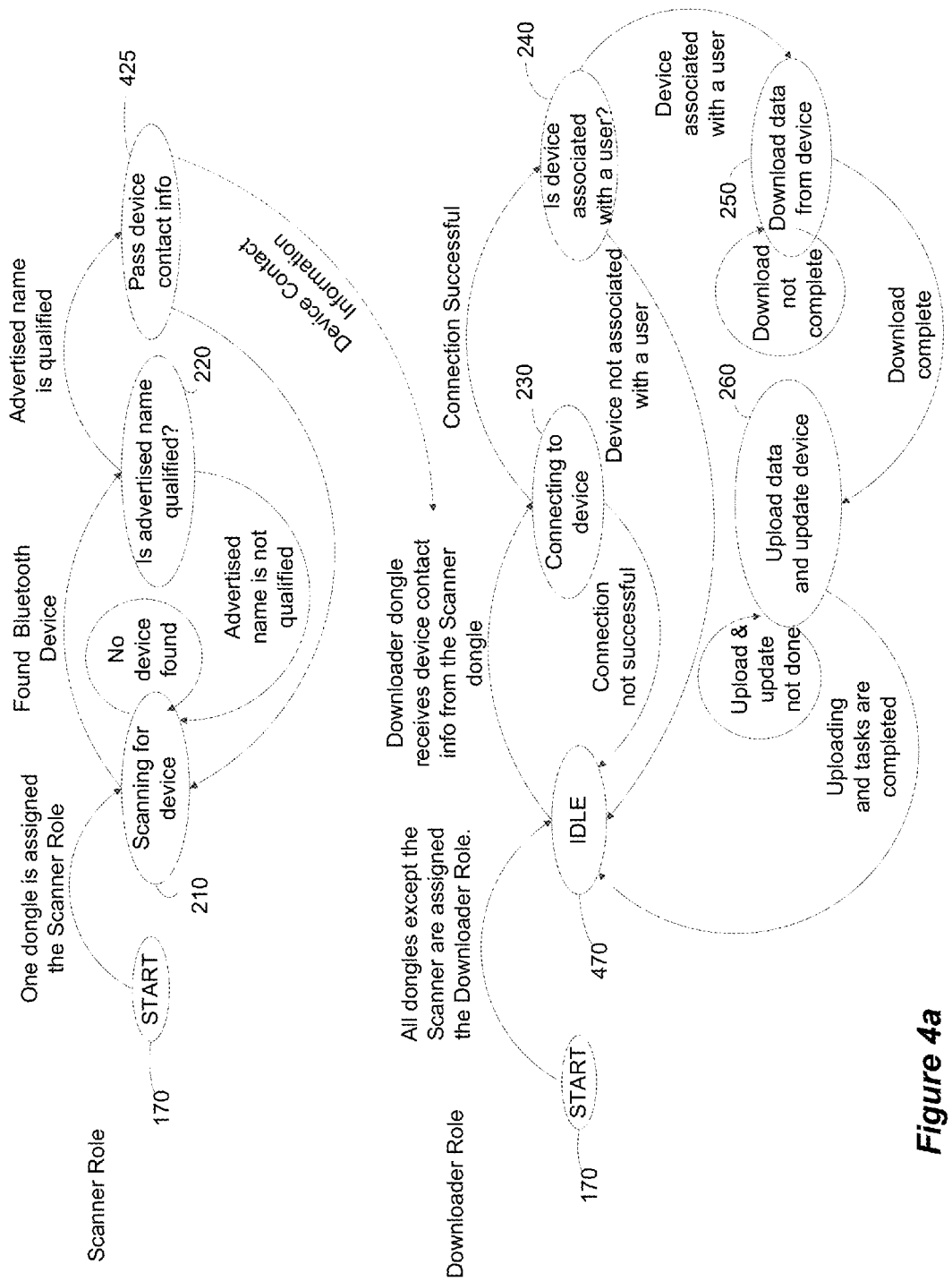
FIG. 4a is a diagram illustrating another approach for data downloading with two or more dongles, in accordance with one or more techniques of this disclosure.

FIG. 4a shows another example approach to handling multiple dongles 512 within central station 510, termed the Fixed-Role State. In this example approach, only one dongle (the Scanner) is assigned to the Scanner Role, which is illustrated in the upper portion of FIG. 4a. After being assigned the Scanner Role, the Scanner listens for available devices (210). When it detects an available device, the Scanner determines whether the device's advertised name is qualified (220). In some example approaches, if the advertised name is qualified, the Scanner attempts to pass the device's contact information to an idle dongle (425). Whether or not passing of device data was successful, the Scanner returns to scanning (210). (In other example approaches, station 510 may determine whether the advertised name was qualified using the Downloader dongle instead of the Scanner, or, in some example approaches, eliminate the qualification step entirely.)

In the Fixed-Role State, a dongle 513 that receives device contact information from a Scanner dongle 513 has been assigned the Download Role and is called the Downloader. The Downloader uses the contact information to connect to the device detected by the Scanner (230). If the Downloader connects, it checks the unique identifier it receives from the device against a list of device identifiers in the database to determine whether the device is associated with a registered user (240). Other qualification criteria could be used as well. If the device is associated with a registered user, the Downloader downloads data from the device to which it is connected (250). When the download is complete, the system transfers the downloaded data to database 550 and makes any necessary adjustments to the device (260). Once complete, the dongle returns to an idle state (470) until it receives new contact information from the Scanner.

Figure 4B:
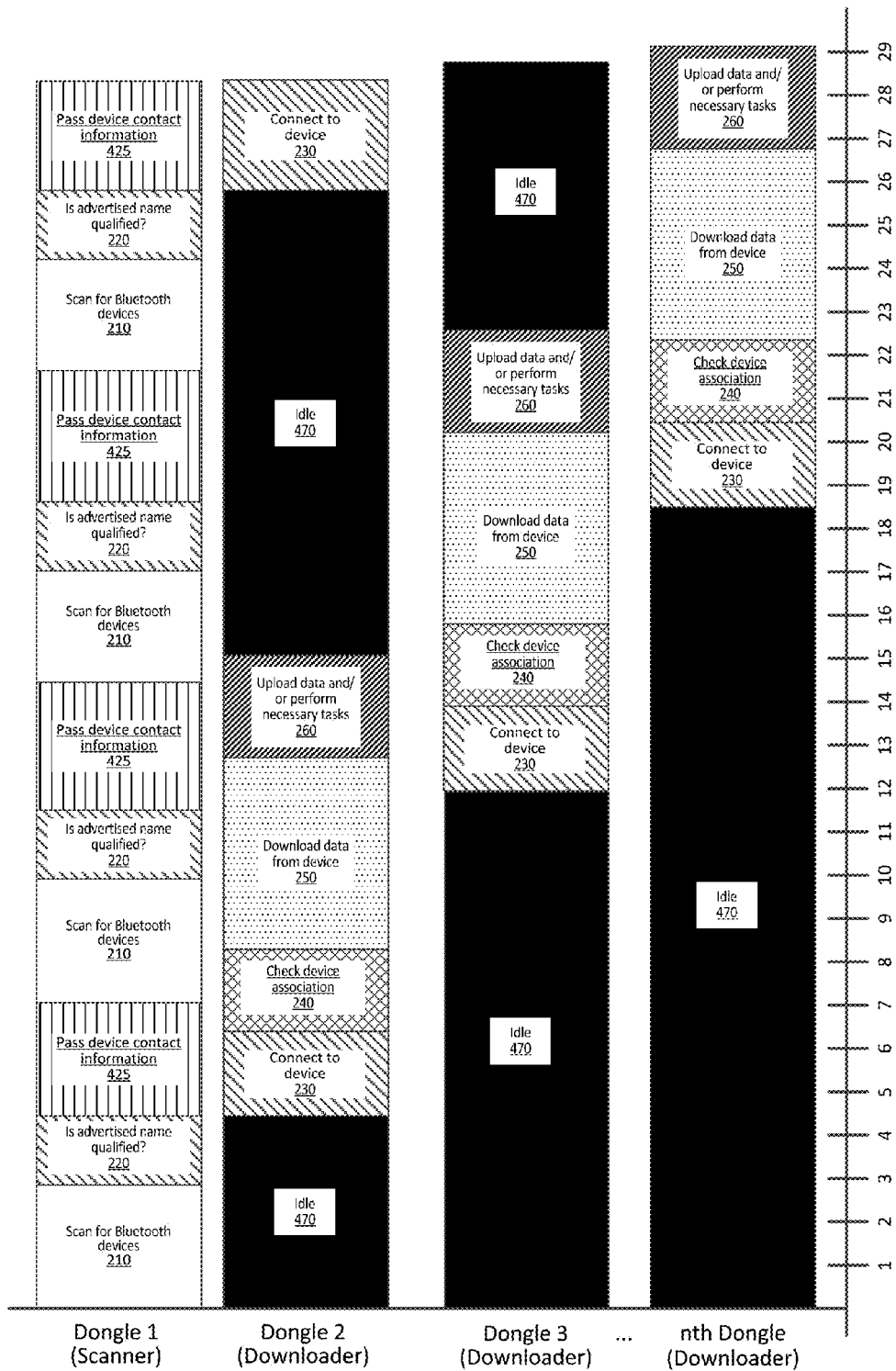
FIG. 4b is a diagram illustrating another example data download system timeline.

FIG. 4b shows an example of a sequence of tasks performed by each of four dongles in the Fixed-Role State described in FIG. 4a. The time scale is the same for all four but is otherwise arbitrary. Dongle 1 is the Scanner dongle 513 and is the only dongle that scans, qualifies advertised names, and sends device contact information. The rest of the dongles are Downloaders. The Scanner sends the contact information of a particular device to only one Downloader. The Downloaders remain inactive until they receive contact information from the Scanner. In each case that the Scanner scanned, it found a device, the device's advertised name was found to be qualified, and the particular device was associated with a registered user. A different example might find devices that were not qualified or were not associated with a user.

Figure 6:
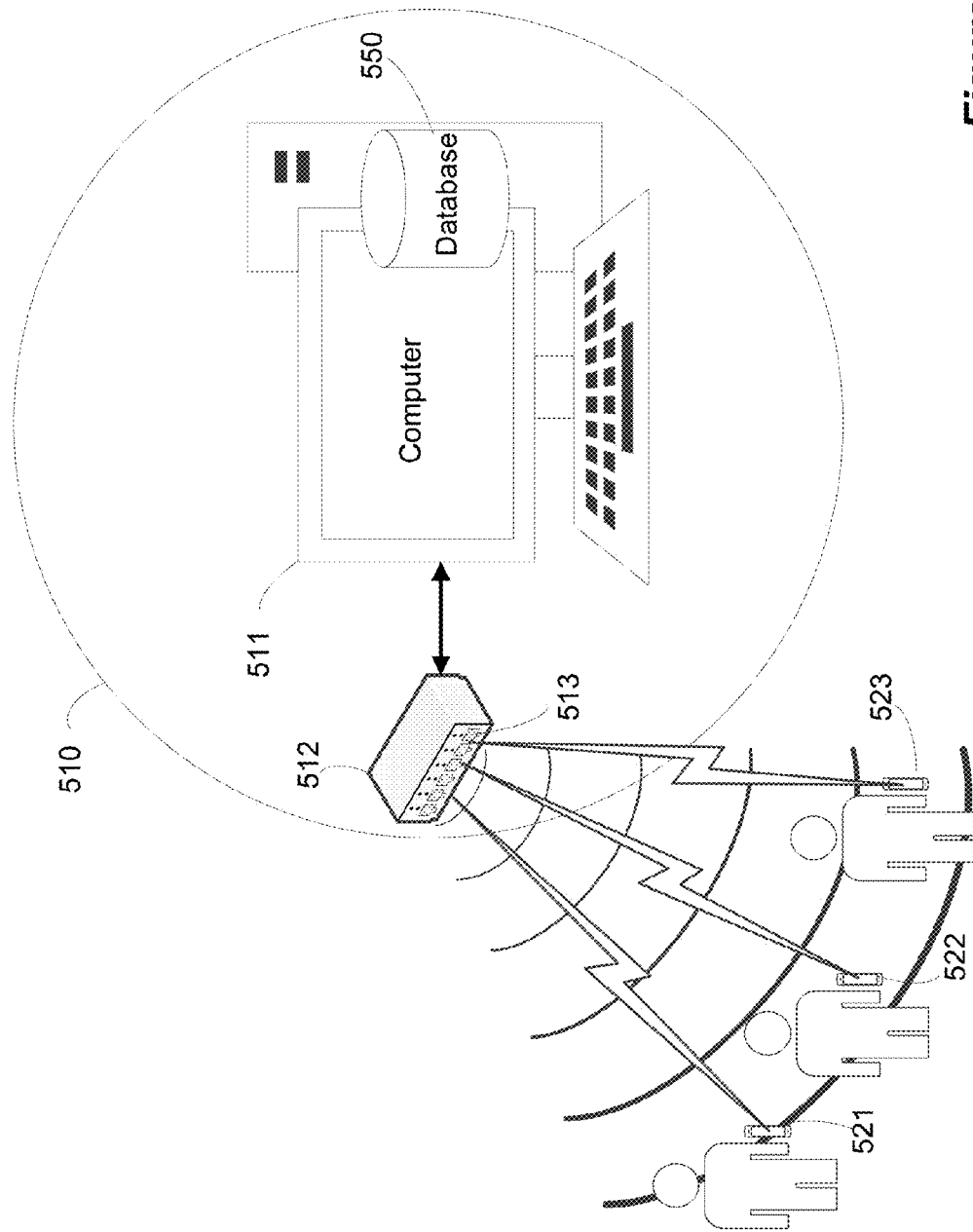
FIG. 6 is a diagram illustrating another example system for downloading data from Bluetooth devices, in accordance with one or more techniques of this disclosure.

FIG. 6 illustrates another example system for gathering data from Bluetooth devices. In the approach shown in FIG. 6, database 550 is internal to the computer 511. Therefore, there may not necessarily be a need for a database server or an internet connection.

Figure 7:
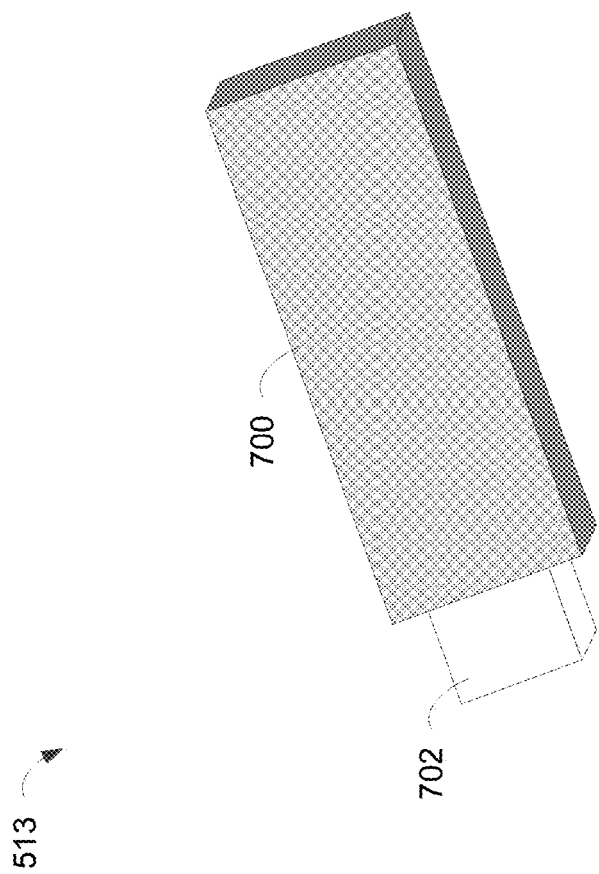
FIG. 7 is a diagram illustrating an example of a dongle, in accordance with one or more techniques of this disclosure.

FIG. 7 illustrates an example of a dongle 513. In the example shown dongle 513 includes a housing 700 that communicates through connector 702 to hub 512. In the example shown, connector 702 is a USB connector. Other connectors can be used as well.

In some example approaches, each dongle 513 is capable of communicating on two or more channels at the same time. This technique is used in some instances to communicate with a single client device on multiple channels and in other instances to communicate with multiple client devices, with each assigned a single channel.

In some example approaches, each dongle is capable of communicating on one channel at a time. In such example embodiments, system 510 assigns a dongle 513 to each client device so that data can be downloaded from each device at the same time. In some such approaches, random delays are introduced in transmission as noted above to reduce interference. In some example approach, system 510 includes enough hubs 512 to support forty dongles and is capable of communicating with up to forty devices in parallel.

The methods and software allow a single computer to connect with up to 40 devices in parallel, with each device connected on a different Bluetooth channel. The more parallel connections a computer has, the higher the probability of channel interference. Channel interference can be reduced by inserting short delays between transmission slots to decrease the likelihood that transmissions on different channels will overlap chronologically. In theory, channel interference could be eliminated by synchronized frequency-hopping-ordering all channel changes to assure that each connection switches to an unused channel. However, the current Bluetooth protocol does not support synchronized frequency-hopping.

After each of the 40 channels contains a connection, further devices can connect using time division multiplexing (TDM). TDM divides a channel serially with multiple devices taking turns communicating on one channel frequency.

In some example approaches, a Bluetooth data gathering system includes a computer connected to a database (either internal or external) and two or more Bluetooth dongles. As determined by the software, the system adopts a system state. That is, a method for using the dongles connected to the computer. The system state may dictate that different dongles perform different tasks at different times. A dongle may perform all tasks necessary to communicate with a client device or only a subset of the necessary tasks. Thus, the system can coordinate the tasks of the different dongles to maximize the efficiency of downloading data from multiple devices.

In some example approaches, the system may only download data from a client device if the device meets at least one criterion. However, the criterion may be as rudimentary as the client device's ability to communicate using the Bluetooth protocol. If this criterion is used, it results in a system that will download data any time that it can. Other possible criteria for the client device include: previous registration in a database, not having uploaded information to the system within a specified amount of time, or a requirement as to the device's type. Any embodiment may also queue waiting devices so that the device that has been waiting the longest is the next to have an opportunity to connect.

In one example approach, the system adopts the Rotational State. In Rotational State, a first dongle scans for available devices while one or more other dongles are either downloading data from other devices or idle. When the first dongle detects a device with which it can connect, it triggers a second dongle to start scanning. If the device meets one or more criteria, the first dongle will proceed to download data from the device. The second dongle follows the same routine as the first. The process repeats until the last dongle detects a device triggering the first dongle to start scanning again.

In another example approach, the system adopts a Fixed-Role State. In the Fixed-Role State, individual dongles only perform a subset of the tasks necessary for the system to download data from the client device. In one such example approach, one dongle (the Scanner) performs the Scanner Role and at least one other dongle performs the Download Role. In the Scanner Role, the dongle detects available Bluetooth devices in its range. When the Scanner detects an available device, it transfers the device's contact information to a different dongle (the Downloader) that performs the Download Role and then resumes scanning. The Scanner may, optionally, assign a device to a Downloader dongle only if one or more criteria are satisfied. When a Downloader receives contact information for a device, it connects with the specified device and downloads data from the device if the device meets the one or more criteria.

In yet another example approach, in a Fixed-Role State, the Scanner dongle may convert to Download Role if it detects a device while all Downloader dongles are occupied.

This detailed description of the invention is neither exclusive nor exhaustive and is intended neither to describe all possible embodiments of the invention nor to limit the scope of the invention.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

We claim:
1. A system comprising:
a processor;
a plurality of dongles, each of the plurality of dongles being communicatively coupled to the processor;
a non-transitory computer-readable medium communicatively coupled to the processor, the non-transitory computer readable medium storing instructions that, when executed by the processor, cause the processor to:

direct a first dongle to scan for client devices available to connect using a Bluetooth protocol;

if the first dongle detects a first client device available to connect, determine whether a unique identifier of the first client device is present in a list of one or more unique identifiers;

if the unique identifier of the first client device is present in the list of one or more unique identifiers:
connect a second dongle to the first client device on a first channel;
direct the first dongle to scan for client devices available to connect using the Bluetooth protocol; and
determine a first amount of elapsed time since a most recent instance of the system downloading information from the first client device;

if the first amount of elapsed time is greater than a first threshold, download data from the first client device on the first channel using the second dongle;

if the first dongle detects a second client device available to connect, determine whether a unique identifier of the second client device is present in the list of one or more unique identifiers;

if the unique identifier of the second client device is present in the list of one or more unique identifiers:
direct a third dongle to connect to the second client device on a second channel;
direct the first dongle to scan for client devices available to connect using the Bluetooth protocol; and
determine a second amount of elapsed time since the system most recently downloaded information from the second client device;

if the second amount of elapsed time is greater than the first threshold, determine whether the second dongle is occupied; and if the second dongle is occupied, download data from the second client device using the third dongle.

2. The system of claim 1 in which, within an instance of the processor executing the instructions:
the first dongle does not download data from a client device; and
neither the second dongle nor the third dongle scan for client devices available to connect using the Bluetooth protocol.

3. The system of claim 1 in which, if the second dongle is occupied, the second dongle is occupied downloading data from the first client device.

4. The system of claim 1 in which:
the processor connects the second dongle to the first client device only if the first client device is of an approved device type and
the processor directs the third dongle to connect to the second client device only if the second client device is of the approved device type.

5. The system of claim 1 in which the instructions cause the processor to:
download data from the first client device only if:
the first client device is of a specified device type; or
the first client device presents a user identifier present on a list of user identifiers; and
download data from the second client device only if:
the second client device is of the specified device type; or
the second client device presents a user identifier present on the list of user identifiers.

6. The system of claim 1 in which the instructions cause the processor to:
introduce delays between transmission slots on the first channel when downloading data from the first client device; or
introduce delays between transmission slots on the second channel when downloading data from the second client device.

7. The system of claim 6 in which the delays between transmission slots of at least one of the first channel or the second channel are random.

8. The system of claim 1 in which the system synchronizes frequency hopping of the first channel with frequency hopping of the second channel.

9. The system of claim 1 in which the first dongle sends contact information for the first client device to the second dongle before the second dongle connects to the first client device.

10. The system of claim 1 in which the system simultaneously downloads data from the first client device and the second client device.

11. The system of claim 10 in which the first client device and the second client device are one and the same.

12. The system of claim 1 in which:
the system downloads data from the first client device and a third client device on the first channel using time division multiplexing or
the system downloads data from the second client device and a fourth client device on the second channel using time division multiplexing.

13. The system of claim 1 in which:
after downloading data from the first client device, the system issues a command to the first client device causing the first client device to cease transmitting radio signals for a specified amount of time; or
after downloading data from the second client device, the system issues a command to the second client device causing the second client device to cease transmitting radio signals for a specified amount of time.

14. The system of claim 1 in which the system assigns a first number to the first client device, assigns a second number to the second client device, and connects to the respective client devices in order of the respective number assigned to each device.

15. A system comprising:
a processor;
a plurality of dongles, each of the plurality of dongles being communicatively coupled to the processor;
a non-transitory computer-readable medium communicatively coupled to the processor, the non-transitory computer readable medium storing instructions that, when executed by the processor, cause the processor to:
direct a first dongle to scan for client devices available to connect using a Bluetooth protocol;
if the first dongle detects a first client device available to connect, determine whether a unique identifier of the first client device is present in a list of one or more unique identifiers; and
if the unique identifier of the first client device is present in the list of one or more unique identifiers:
direct a second dongle to scan for client devices available to connect using the Bluetooth protocol;
connect the first dongle to the first client device on a first channel; and
determine a first amount of elapsed time since a most recent instance of the system downloading information from the first client device;

if the first amount of elapsed time is greater than a first threshold, download data from the first client device on the first channel using the first dongle;

if the second dongle detects a second client device available to connect, determine whether a unique identifier of the second client device is present in the list of one or more unique identifiers;

if the unique identifier of the second client device is present in the list of one or more unique identifiers:
connect the second dongle to the second client device on a second channel; and
determine a second amount of elapsed time since the system most recently downloaded information from the second client device; and
if the second amount of elapsed time is greater than the first threshold, download data from the second client device using the second dongle.

16. The system of claim 15 in which, if the unique identifier of the second client device is present in the list of one or more unique identifiers, the instructions direct the processor to:
direct the first dongle to scan for client devices available to connect using the Bluetooth protocol if the first dongle is not occupied;
direct a third dongle to scan for client devices available to connect using the Bluetooth protocol if there is a third dongle that is not occupied; or
direct the first dongle to scan for client devices available to connect using the Bluetooth protocol when the first dongle is no longer occupied if the first dongle is occupied and there is no third dongle.

17. The system of claim 15 in which the system simultaneously downloads data from the first client device and the second client device.

18. The system of claim 17 in which the first client device and the second client device are one and the same.

19. The system of claim 15 in which:
the processor connects the first dongle to the first client device only if the first client device is of an approved device type and
the processor connects the second dongle to the second client device only if the second client device is of the approved device type.

20. The system of claim 15 in which the instructions cause the processor to:
download data from the first client device only if:
the first client device is of a specified device type; or
the first client device presents a user identifier present on a list of user identifiers; and
download data from the second client device only if:
the second client device is of the specified device type; or
the second client device presents a user identifier present on the list of user identifiers.

21. The system of claim 15 in which the instructions cause the processor to:
introduce delays between transmission slots on the first channel when downloading data from the first client device; or
introduce delays between transmission slots on the second channel when downloading data from the second client device.

22. The system of claim 21 in which the delays between transmission slots of at least one of the first channel or the second channel are random.

23. The system of claim 15 in which the system synchronizes frequency hopping of the first channel with frequency hopping of the second channel.

24. The system of claim 15 in which:
the system downloads data from the first client device and a third client device on the first channel using time division multiplexing or
the system downloads data from the second client device and a fourth client device on the second channel using time division multiplexing.

25. The system of claim 15 in which:
after downloading data from the first client device, the system issues a command to the first client device causing the first client device to cease transmitting radio signals for a specified amount of time; or
after downloading data from the second client device, the system issues a command to the second client device causing the second client device to cease transmitting radio signals for a specified amount of time.

26. The system of claim 15 in which the system assigns a first number to the first client device, assigns a second number to the second client device, and connects to the respective client devices in order of the respective number assigned to each device.

* * * * *